UNITED STATES PATENT OFFICE.

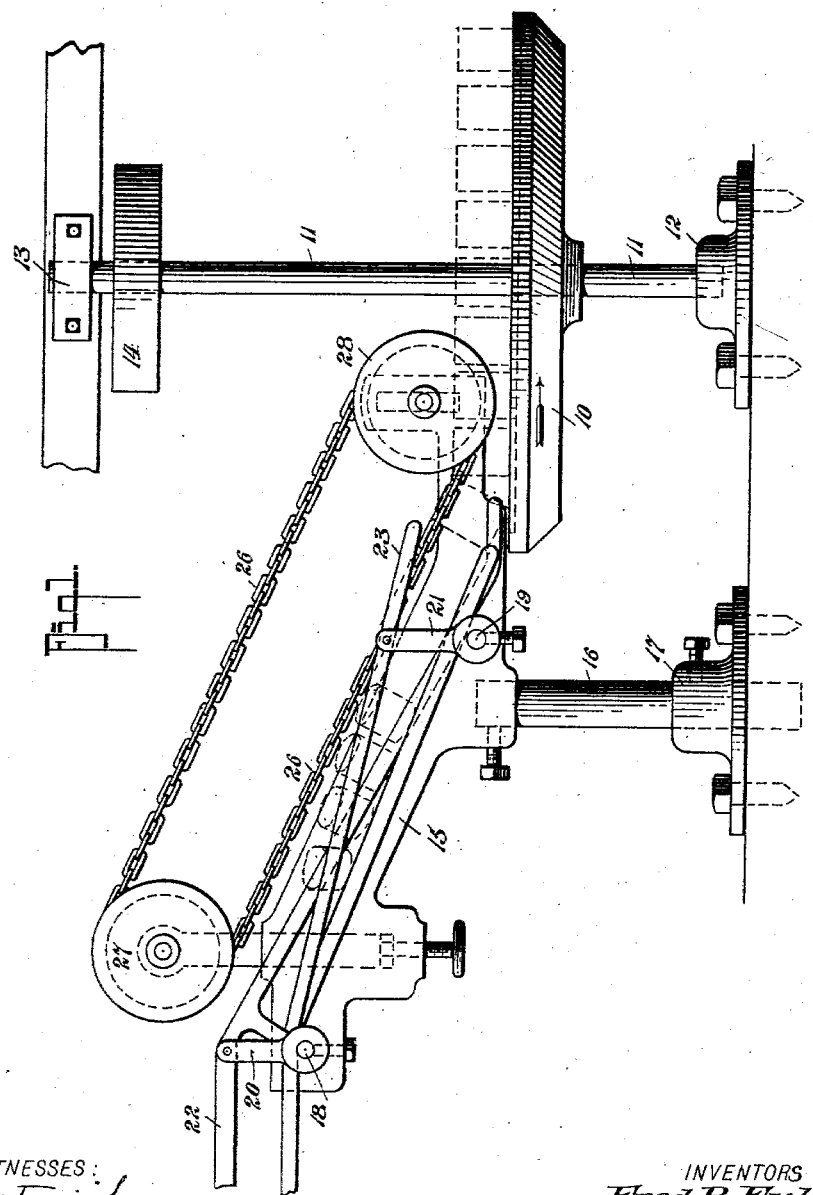

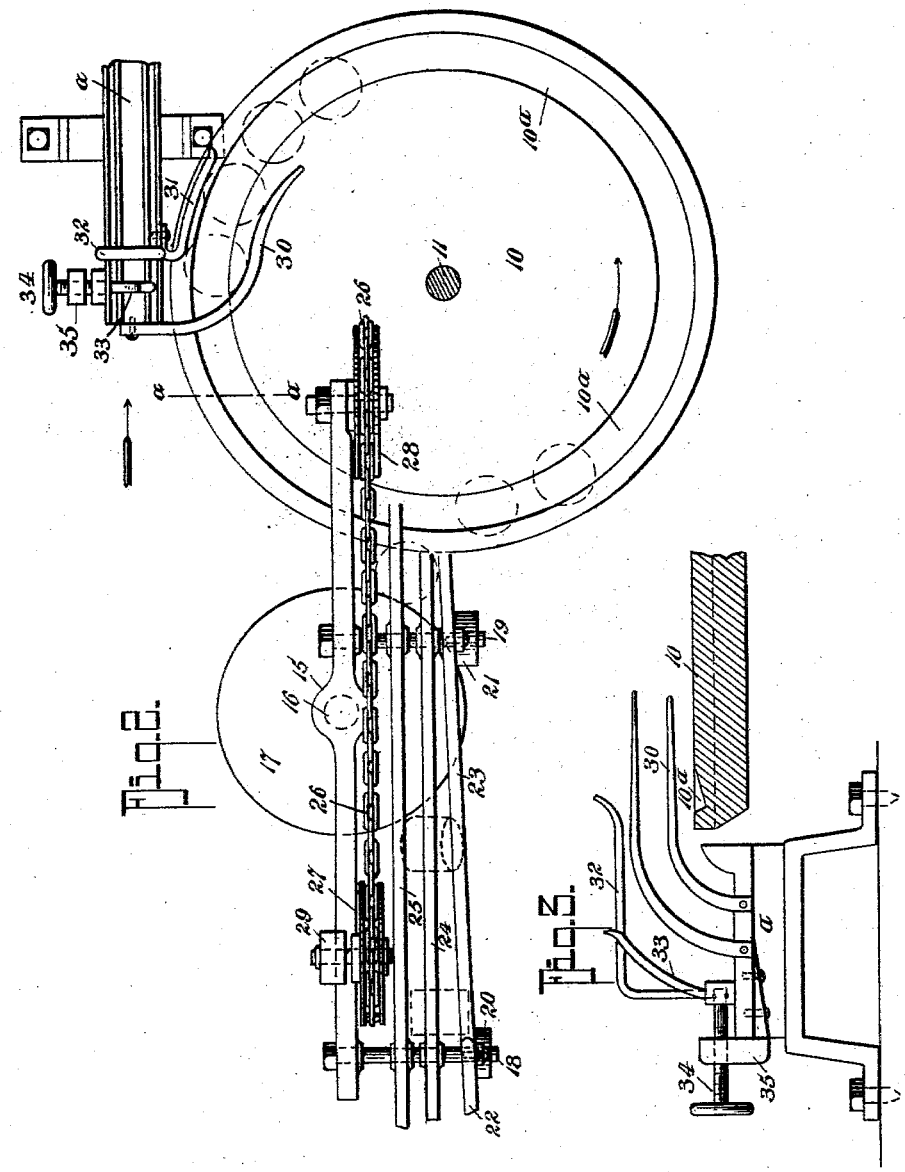

FRED B. FULTON AND DANIEL COOK, OF VANCOUVER, CANADA.

DEVICE FOR ASSEMBLING AND COOLING CANS.

SPECIFICATION forming part of Letters Patent No. 629,189, dated July 18, 1899.

Application filed December 29, 1898. Serial No. 700,638. (No model.)

*To all whom it may concern:*

Be it known that we, FRED B. FULTON and DANIEL COOK, citizens of the Dominion of Canada, residing at Vancouver, in the Province of British Columbia, Canada, have invented certain new and useful Improvements in Devices for Assembling and Cooling Cans, of which the following is a specification.

Our invention relates to improvements in handling cans immediately after coming from the soldering or fluxing machine; and its object is to provide a means of treating such cans while the solder is hot in a manner that will reduce the percentage of the leaks in the freshly-sealed joints to a minimum by turning them in a gentle manner upright, with their pierced ends over a grooved disk or wheel, which is slowly moving, before passing them forward down the ordinary delivery-chute. By turning the freshly-soldered end downward, after the can has been filled and sealed, for a few seconds the hot solder is allowed to properly settle around the joint and chill before the can is passed into the delivery-chute and allowed to roll away, which movement, if the solder is not properly set, causes a great number of cans to leak by the solder being shaken from the joints.

We attain the above object by the mechanism illustrated in the accompanying drawings, in which—

Figure 1 shows a front elevation of our invention. Fig. 2 is a plan of the same, and Fig. 3 is an end view of the final delivery-chute and a section of the cooling-wheel on the line *a a*.

Similar numerals and letters designate corresponding parts throughout all of the several views.

Our invention consists of a rotary disk or wheel 10, securely fixed to a vertical shaft 11, resting upon a step 12, which is securely fixed to the floor or a suitable foundation, and the opposite or upper end of the shaft is journaled in a box 13, secured to some suitable support. Slow movement is imparted to the said shaft 11 by a belt taking around a pulley 14, fixed on the same.

As shown in Figs. 2 and 3, the wheel 10 is provided on its upper face, near its rim, with an annular groove $10^a$, of greater width than the disks or plates soldered to the caps of cans for sealing the same, whereby the solder at the joints is prevented from coming in contact with and being brushed off by the wheel. The inner edge of this groove is of a sloping pitch. This is for the purpose of allowing the cans to be pushed forward over the same in an upright position without offering a serious resistance, the full object of which will be seen presently. To deliver the newly-soldered cans from the fluxing or soldering machine to the wheel and in doing so turn them in an upright position, we provide a chute consisting of a downwardly-sloping frame 15. This frame is supported on the column 16, which is secured in a step or bracket 17 on a suitable support.

Secured to the frame 15 and projecting laterally across the can-track are support-bars 18 and 19, respectively. To these support-bars are secured upwardly-projecting brackets 20 and 21, and to the bracket 20 is secured the end of a guide-rail 22, which extends along the fluxing-machine and guides the cans therefrom, and the bracket 21 supports a rail 23, the opposite end of which lies on the support-bar 18. This holds the said rail in an angling position in relation to other rails 24 and 25, which lie on the support-bars 18 and 19. As shown by Fig. 2, the lower end of the rail 23 where connected with the bracket 21 is angling into the chute or runway for the cans, and by reason of the opposite end being on a plane with the said rails 24 and 25 as the cans roll downward their ends rise up the rail 23 and they are turned on end, from where they are conveyed in that position to the wheel 10 by a chain 26, taking around wheels 27 and 28, suitably mounted on the opposite ends of the frame 15. These wheels may be adjusted vertically, so that the conveying-chain 26 will engage cans of various dimensions, and the rails 23, 24, and 25 may be adjusted on the support-bars 18 and 19 to receive cans of various sizes. Movement is imparted to the conveying-chain by a belt taking around a pulley 29, secured on the shaft to which is attached the wheel 27.

For delivering the cans from the machine to the chute *a* we provide arms 30, which extend over the annular groove, over which the cans rest on the wheel, these being fixed to the end of the chute $a$. On the opposite side of the can-track is an arm 31, which is secured to the side of the chute $a$. These arms guide the cans from the wheel 10, and as they leave the same they fall over on their peripheries in the chute and roll away. To insure the cans falling from the wheel 10 fairly at right angles to the said chute $a$, so that they will roll away, we provide a guide 32, secured on the outer side of the said chute and passing laterally over the same, so that the cans will roll thereunder, and to provide that they do not tilt too far and possibly strike on the outer edge of said chute we provide a guide 33, extending over the space where each can falls, but above the same and curved forward, so that if a can falls too far it is prevented from remaining on the edge of the chute.

The outer edge of the chute $a$ is arranged to be adjusted to accommodate cans of various lengths. This is done by a screw 34, passing through a raised lug 35, which is secured integral with the bed of the chute, and the inner end of the screw loosely fixed in the movable rail of the chute.

In the operation of our invention the cans after being sealed are passed down the chute and inverted to bring the plates or disks, soldered to their caps, over the groove $10^a$, which prevents the solder from coming in contact with and being brushed off by the wheel, and the said groove $10^a$ also allows a circulation of air beneath the cans and permits the escape of heat and causes them to cool more rapidly. The time occupied passing around on the wheel allows the solder to properly set, so that the rolling down the chute $a$ will not cause any leaks. The solder also sets better around the joints when the cans are inverted than when they are in an upright position, as it is liable to scatter when the cans are in the latter position. As the cans come to the fingers 30 they are pushed from the wheel and allowed to roll down the chute $a$ in the usual manner.

Having now described our invention, what we claim, and desire to be protected in by Letters Patent, is—

1. In an apparatus for assembling cans in an upright position after coming from the soldering-machine, a wheel or disk 10 suitably mounted on a vertical shaft 11 with means of imparting slow movement thereto, an annular groove $10^a$ around the upper surface of the said wheel, over which the newly-soldered ends of the cans are caused to rest while cooling, said groove $10^a$, being arranged to permit the escape of steam and to prevent the solder from coming in contact with the wheel and means for conveying the cans to and from the said wheel, as specified.

2. In combination with a wheel 10 having an annularly-formed groove around its upper surface arranged to permit the escape of steam from the cans and to prevent the solder from coming in contact with the wheel, a chute consisting of a frame 15 adjustably mounted on a column 16, secured to a suitable support, support-bars 18 and 19 extending laterally from the same frame, brackets 20 and 21 adjustably secured to said bars, and supporting-rails 23, 24 and 25 arranged over the bars 18 and 19 with their lower ends in proximity to the upper surface of said wheel 10, as and for the purposes set forth.

3. In a device for assembling cans in an upright position while the solder is cooled, a wheel 10 having a groove $10^a$ around its upper surface to permit the escape of steam and to prevent the solder from coming in contact with the wheel, in combination with a chute for delivering the cans thereto and turning them as specified; and of means for delivering the cans from the said wheel to a chute and turning them back to their first position, substantially as and for the purposes specified.

FRED B. FULTON.
DANIEL COOK.

Witnesses:
W. G. TRETHEWEY,
ROWLAND BRITTAIN.